Patented Feb. 9, 1932

1,844,387

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

CATALYTIC OXIDATION OF NAPHTHALENE

No Drawing. Original application filed August 8, 1927, Serial No. 211,638. Divided and this application filed March 26, 1928. Serial No. 264,975.

This invention relates to processes of oxidizing naphthalene to intermediate oxidation products such as alphanaphthaquinone, phthalic anhydride, maleic acid and the like. More particularly the invention is directed to processes of oxidizing naphthalene in the vapor phase.

According to the present invention naphthalene is oxidized to intermediate products, especially in the vapor phase, in the presence of catalysts or contact masses which contain non-silicious base exchange bodies. Some of these new catalysts and contact masses have been described and claimed as products in my Patent No. 1,694,620 dated December 11, 1928, of which the present application is in part a continuation.

The non-silicious base exchange bodies used in the present invention may be produced by the reaction of metallate components with metal salt components under conditions so that the reaction mixture remains substantially alkaline to litmus. The invention is in no sense restricted to the use of catalysts which are the reaction products of a single metallate and a single metal salt component, and some of the most effective catalysts for use in the present invention are the reaction products of a plurality of metallate components with one or more metal salt components or a plurality of metal salt components with one or more metallate components.

All of the base exchange bodies used in the present invention, that is to say catalytically active bodies which are prepared by the reaction of a single metallate with a single metal salt or bodies produced by the reaction of at least one metallate with a plurality of metal salts, or vice versa, possess a remarkably porous, frequently microporous, structure and in some cases are opalescent. When suitable catalytically active components are present in the products, they form catalysts of remarkable efficiency due probably to the extraordinarily high surface energy of the microscopically porous structures and probably also to the presence of unsaturated valences in many cases and a symmetry of molecules. It is of course possible that the catalytic activity of the products is due partly or wholly also to other reasons, and the present invention is not intended in any sense to be limited by any theory of action of the products. The molecular complexes which are present are apparently of great size and complexity, and the exact chemical constitution has not been determined. In fact it is not even definitely determined whether single chemical compounds are formed in any or all cases and it is possible that molecular mixtures are present. The products possess a physically microscopical homogeneity and behave in many ways as if they were single compounds, and I am of the opinion that probably in many cases the products are in fact single compounds of very high molecular weight, but the invention is not limited to any theories of the chemical constitution of the products.

It should be clearly understood that the products used in the present invention are chemically quite distinct from base exchanging bodies containing silicon, such as for example the zeolites and related base exchange bodies and their derivatives. The present compounds contain no silicon in their structure, and while they share many of the physical properties of zeolites, namely, the highly porous structure and the power of exchanging their alkali cations for other cations by base exchange, they are chemically distinct products. Surprising as it may seem, the presence of silicon, which has hitherto been considered as essential to the formation of the skeletons of such advantageous physical structure, appears to be only one of many elements which are capable of bringing about these physical properties and many of the base exchange bodies of the present invention possess all of the mechanical strength and resistance of the silicious zeolites, properties which are of course of utmost importance in catalytic oxidations of organic compounds.

A number of elements are capable of forming alkali metal metallates, at least in their higher states of oxidation, and can be used singly or in mixtures, as the metallate components for producing base exchange bodies used in the present invention, it being understood of course that the choice will depend on the metal salts to be used and on the catalytic effects which it is desired to produce. Among the elements which form metallates are the following:—aluminum, chromium, zinc, vanadium, beryllium, tin, palladium, platinum, titanium, zirconium, tungsten, uranium, tantalum, boron and molybdenum. The elements which form the metallates may be present in the form of their oxides or hydroxides united with alkali to form simple metallates, or they may be present partly or wholly in the form of complex compounds, such as, for example, ammonia complexes, cyanogen complexes, and the like. In general, the complex compounds described in the prior patent of Jaeger and Bertsch, No. 1,782,353 dated November 18, 1930, may be used.

The metal salt components include the water soluble, neutral or acid salts of the following elements:—copper, silver, gold, beryllium, zinc, cadmium, aluminum, rare earths, titanium, zirconium, tin, lead, thorium, chromium, uranium, vanadium, manganese, iron, nickel, cobalt, platinum, palladium, which may be used alone or in any desired mixture. It is an advantage of the present invention that definite proportions of the individual compounds do not need to be used, either because mixtures of different compounds are formed, or more probably because the tremendous size and complexity of the molecule masks any requirements for definite proportions.

All of the products used in the present invention possess base exchanging powers to a greater or less extent when first prepared in solutions which are substantially neutral or moderately alkaline to phenolphthalein. For the oxidation of naphthalene, however, high base exchanging power of the products is not required and it is therefore possible to depart considerably from the optimum conditions of production as far as base exchange power goes. In other words, the limits of alkalinity, neutrality or acidity are much wider than in the case of products which are to be used for water softening, and which therefore depend primarily on their base exchanging power. While usually the highest base exchanging powers are obtained when the compounds are produced in a reaction mixture which is substantially neutral or moderately alkaline to phenolphthalein, products having a similar physical structure and being desirable for the catalytic oxidation of organic compounds can be prepared with somewhat different proportions of the components, so that at the end of the reaction the mixture may possess any alkalinity or acidity between phenolphthalein red and litmus blue as indicator end points.

The possibilities of producing catalysts according to the present invention are not limited to the reaction products of the metallates and metal salt components which may be used and which are present in the molecules in a non-exchangeable form. On the contrary, a further series of products can be prepared by exchanging part or all of the alkali cations for other atoms or radicals by means of base exchange. The number of cations which can be introduced is very large, and some of them are included in the following elements and radicals:—ammonium, copper, silver, gold, beryllium, magnesium, caesium, zinc, strontium, cadmium, barium, mercury, aluminum, thallium, titanium, zirconium, tin, thorium, vanadium, chromium, uranium, manganese, iron, cobalt, nickel, palladium, platinum. These cations may be introduced either singly or in mixtures, simultaneously or successively. The wide possibilities of combination which can be effected by the introduction of various cations by means of base exchange gives the catalytic chemist an almost infinite field of choice in preparing catalysts having just the right degree of activity for organic oxidations and it is an advantage of the present invention that catalysts of exceedingly finely adjusted activity can be produced and are effective. The cations introduced by base exchange may be themselves catalytically active, or they may activate catalytic components which are present in the products in non-exchangeable form. Cations may also be introduced as simple ions or as complex ions. In all cases, the catalytic activity of the products obtained is enhanced by the favorable physical structure of the products.

A further series of products can be obtained by treating the base exchange bodies used in the present invention, either with or without the presence of cations introduced by base exchange, with products containing anions which are capable of reacting with the base exchange body to form salt-like products.

In the contact masses containing salt-like bodies which are used in the present invention the catalytically effective components may be present solely in the base exchange body, solely in the anion of the salt-like body, or partly in one and partly in the other. Acid radicals of the following elements, either simple acids, polyacids or complex anions, can be used in producing salt-like bodies with the base exchange bodies of the present invention:—vanadium, tungsten, uranium, chromium, molybdenum, manganese, tantalum, arsenic, phosphorous, bismuth, sulfur, chlorine, platinum, boron. Complex ions, such as, for example, ferro- and ferricyanogen, sulfocyanogen metal cyanogen, and the like, may also be used whereever they form salt-like bodies with the base exchange bodies of the present invention. A single acid radical may be introduced, or a mixture may be used, either by a simultaneous or successive treatment. The amount of the acid radical used may also be varied so that the products may possess the character of acid, neutral or basic salts.

While it is possible to use certain of the catalysts of the present invention in an undiluted form, best results are usually obtained by the dilution of the products with more or less inert bodies, or with bodies of relatively feeble catalytic powers or activating powers. Diluents can be incorporated with the catalytically active base exchange body before or after formation, and are preferably although, not necessarily, incorporated therewith to produce a physically homogeneous structure. In addition to finely divided carriers, diluted or undiluted catalytically active base exchange bodies can be coated on or impregnated in relatively massive carrier fragments, the incorporation taking place before, during or after formation of the base exchange body. It should be understood of course in all cases that where a perfectly homogeneous product is desired, the incorporation of diluents must take place before the base exchange body after formation has set. Practically all of the base exchange bodies used in the present invention are first formed as gels, in which condition they can be incorporated with diluents or carrier bodies, but after once setting, and particularly after drying, it is of course impossible to incorporate diluents into the base exchange body other than by purely mechanical mixture, which in general is less desirable, but which is not excluded from the broader aspects of the present invention.

A large number of diluent bodies can be used, such as silicious materials, as kieselguhrs of all kinds, diatomite brick refuse, pumice meal, pulverized quartz, sand, and other minerals, especially those rich in silica. In the same way, a large number of natural or artificial massive carrier fragments can be used, such as fragments of pumice, diatomite bricks or other minerals, metal granules and the like. In general, the methods of incorporation and many of the diluents which can be used are described in the co-pending application of Jaeger and Bertsch, Serial No. 95,771, filed March 18, 1926.

The high porosity of the products which are prepared may be even further increased by incorporating into the framework of the base exchange body products which can be removed by leaching, volatilization or combustion, and which when removed leave additional porous spaces and produce an even more advantageous physical structure. The substances added may be of organic or inorganic nature and may be added as individuals or may be in chemical combination with some of the permanent components. Thus, for example, certain of the components may be introduced in the form of complex compounds which are later decomposed and then leave additional porous spaces. Examples of such compounds are certain ammonia complexes which can be decomposed by heating the finished product.

In general, the reaction of the component solutions results in the production of soluble salts which are not wanted, and it is therefore usually desirable to wash the base exchange body, after precipitation, and then to dry, or dry first and then wash. I have found that while it is possible in some cases to dry at high temperature, for the best results in most cases drying temperatures of 100° C., or less, are desirable.

In the general methods described above, separately prepared metallate components and metal salt components have been caused to react. While for many purposes these are the preferred methods, it is possible to prepare base exchange bodies by somewhat different methods. Thus, for example, if a solution of a metallate of amphoteric metal is cautiously neutralized with acid until the strongly alkaline reaction becomes weakly alkaline to phenolphthalein, or even slightly acid with weak alkalinity to litmus as a limit, base exchange bodies are produced, and in many cases are of importance. Instead of the metallates, the amphoteric metals may also be present in the form of complex metallate compounds, for example, such complex compounds as are described in the co-pending application of Jaeger and Bertsch, referred to above.

In a similar manner, acid or neutral solutions of salts of amphoteric metals may be treated with alkali until the mixture becomes neutral or alkaline to phenolphthalein, or even acid, in which case base exchange bodies are produced in a manner similar to that described in the foregoing paragraph. The base exchange bodies produced either by neutralizing metallate solutions or metal salt solutions in general do not show quite as great base exchange power as do those which are prepared by causing ready made metallate and metal salt solutions to react with each other. The physical structure, however, appears to be similar and, as in many cases, particularly in the oxidation of naphthalene, extremely high base exchange power is not essential. Many very valuable catalysts can be produced in this manner.

A further wet preparation consists in causing alkali metal salts of the oxygen-containing acids of metal elements of the fifth and sixth groups of the periodic system, such as for example, vanadium, molybdenum, tantalum, tungsten, and the like, to react with neutral or acid salts of metals, particularly metals which are strongly amphoteric. Preferably there should be an excess of alkali. The salts of the fifth and sixth group acids may be used alone or in combination with other metallates.

In addition to the wet methods, which for most purposes I find are preferable, base exchange bodies can be produced by fusion methods, for example, by fusing oxides or hydroxides of the metallate and metal salt components with alkali, such as, sodium carbonate or potassium carbonate or their hydroxides. The base exchange bodies produced by fusion, while sometimes they do not possess quite as high base exchange powers, are nevertheless of a similar advantageous physical structure, and many of the products are very valuable catalysts. Oxides of the metals of the fifth and sixth groups may also be used to form products somewhat similar to those described in the preceding paragraph by fusion methods.

The non-silicious base exchange catalysts described above contain the catalytically active element or elements in chemical combination with the base exchange body or forming part thereof, and they are among the most effective catalysts used in the present invention. It is not necessary, however, that the catalytic activity should reside in the base exchange body itself, and many very important catalysts can be produced in which catalytically inactive base exchange bodies are united with catalytically active diluents to form physically homogeneous masses. These masses, although they do not contain catalytic elements chemically combined with the base exchange body, of course share its microporous structure, and where suitable catalytically active diluents are used, catalysts of great efficiency are obtained, and are included in the scope of the present invention. Of course the catalytic activity may reside both in the diluents and in the base exchange body.

The catalysts used in the present invention, and particularly diluted catalysts, may in many cases with advantage be given a preliminary treatment consisting in a calcination and exposure to oxidizing or acid vapors at an elevated temperature as described in my Patents Nos. 1,678,626 and 1,678,627 dated July 24, 1928. Such treatments frequently produce secondary chemical changes as are produced in the catalyses themselves, and it should be understood that the catalysts of the present invention are defined as to chemical composition as of the time when they are freshly made, in accordance with the usual methods of definition in catalytic chemistry.

Many of the organic reactions which are included in the present invention, and particularly the oxidation of naphthalene, require a slowing down, or stabilizing, of the catalysts used, in order to prevent excessive losses through total combustion, or to permit stopping at a definite intermediate oxidation product with maximum yield. I have found that the presence of salts of alkali-forming metals and other non-catalytic components may act as stabilizers, as may the oxides or hydroxides themselves in some reactions. Where the oxides or hydroxides of alkali-forming metals are present, the catalyst should be subjected to calcination with acid gases before use in order to avoid the presence of strong alkalies in the catalyst. Other catalytically active or activating substances which are not specific catalysts for the oxidation of naphthalene to intermediate oxidation products which enhance the effectiveness of the stabilizers, and which are termed stabilizer promoters, may also be used. In fact whenever base exchange catalysts of the present invention which contain exchangeable alkali metal cations are given preliminary treatment with acid vapors, alkali forming metal compounds are produced which act as stabilizers, and many of the amphoteric or other metal components which are not selective catalysts for the particular oxidation reaction may be considered, and act as stabilizer promoters. I do not claim in this application the use of stabilizers or stabilizer promoters in general, as these form the subject-matter of my prior Patent No. 1,709,853 dated April 23, 1929. The expressions "stabilizers" and "stabilizer promoters", when used in the present application, are to be understood as used in the sense in which they are defined in the aforementioned co-pending application. It should be understood that while many of the base exchange catalysts used in the present invention may be considered as composite stabilizers and stabilizer promoters, the invention is not limited thereto, and stabilizers or stabilizer promoters, or both, may be separately added to the catalysts of the present invention, and in fact many of the diluents, for example those containing certain heavy or amphoteric metal compounds, are to be considered as stabilizer promoters.

The invention will be described in greater detail in connection with the following specific examples which are illustrative merely, and do not limit the broader scope of the invention. The examples, however, do in many cases contain specific features which in their more narrow aspects are included in the present invention. The examples give a few typical reaction conditions and catalysts, but it should be understood that the skilled catalytic chemist will choose within the confines of the present invention catalysts and reaction conditions best suited to the particular installation in which he is interested.

*Example 1*

40 parts of $V_2O_5$ are suspended in 500 parts of water and acidified with a little concentrated sulfuric acid. The suspension is heated almost to the boiling point and gases containing $SO_2$ are passed through until the vanadic acid suspension is completely dissolved as blue vanadyl sulfate. Sometimes it is necessary to add some water in order to get the vanadyl sulfate entirely dissolved.

The blue solution is then divided into two parts, one of which is set aside and the other treated with 5 N. potassium hydroxide solution at 50 to 60° C. until a clear coffee brown solution of potassium vanadite is obtained.

The vanadite solution is mixed with 70 parts of small diatomite brick fragments or 40 parts of "Celite" and 40 parts of quartz particles, the mixture being stirred until it becomes uniform. Other diluent bodies such as neutral silicates, sand, silica gel, ground rocks, tuffs, lava of volcanic or eruptive origin, or similar materials may be used. To the solution containing potassium vanadite the second half of the vanadyl sulfate solution is added, care being taken that even after all of the vanadyl sulfate has been added, the solution remains alkaline or neutral to phenolphthalein. The reaction product, after separation from the mother liquor by filtration and drying at 60 to 70° C., is broken into fragments and constitutes a base exchange body containing potassium and tetravalent vanadium, part of the vanadium playing the part of an acid radical and part that of a base in the non-exchangeable portion of the molecule.

The base exchange body is then sprayed with 3 to 5% inorganic acids such as, for example, sulfuric acid, phosphoric acid, nitric acid, hydrochloric acid or the like until the potassium in the exchangeable part of the base exchange body has been neutralized and a so-called salt-like body is obtained. This salt like body tends to oxidize naphthalene to alphanaphthaquinone or phthalic anhydride, depending on the proportions of air and naphthalene and on the temperature. In general temperatures between 360 and 450° C. should be used.

Example 2

20 parts of $V_2O_5$ are suspended in 500 parts of water, as described in Example 1, acidified with a little concentrated sulfuric acid and reduced to vanadyl sulfate by means of gases containing $SO_2$, the mixture being heated almost to the boiling point. The blue solution obtained is treated with sufficient 2 N. potassium hydroxide solution to precipitate a voluminous brown precipitate of $V_2O_4$ which is then sucked and suspended in 200 parts of water. It is then gradually warmed to 60–70° C. and additional 2 N. potassium hydroxide solution is added until all of the $V_2O_4$ dissolves to form a coffee brown solution. This requires an excess of potassium hydroxide. The potassium vanadite thus produced is then stirred with 60 parts of infusorial earth and 2 N. sulfuric acid is gradually poured into the solution with vigorous agitation until the latter just remains alkaline to phenolphthalein. Instead of sulfuric acid, phosphoric acid may be used. The sulfuric acid brings down a brown precipitate while phosphoric acid brings down a brownish blue precipitate. The precipitates are pressed and then dried at temperatures below 100° C. The products thus obtained are saturated with a dilute waterglass solution formed of 110 parts of 33° Bé. waterglass solution diluted with 100 parts of water. After impregnation, the product is again dried and broken into fragments and treated at 400 to 450° C. with diluted burner gases in order to neutralize the alkali in the base exchangeable part of the body.

The contact mass so prepared is an excellent catalyst for the catalytic oxidation of naphthalene to phthalic anhydride when a naphthalene vapor and air mixture in the proportion of about 1–20 is passed over the catalyst at 370 to 400° C.

Example 3

A product is prepared as described in the foregoing example except that 180 parts of waterglass are used instead of 110. The catalyst thus produced is excellent for the oxidation of naphthalene to alphanaphthaquinone when a mixture of naphthalene vapors and air in the proportion of 1:35 by weight is passed over the contact mass at 370–400° C.

Example 4

20 parts of $V_2O_5$ is reduced to a vanadyl sulfate solution as described in the foregoing examples and is diluted with 60 parts of infusorial earth. 2 N. potassium hydroxide is added in portions in the cold with vigorous agitation until the mixture just remains alkaline to phenolphthalein. The body precipitated is treated in the usual manner as described in the foregoing examples, and is an excellent catalyst for the oxidation of naphthalene to phthalic anhydride, when a naphthalene vapor and air mixture in the proportion of 1:20 is passed over the catalyst at 380–420° C.

Example 5

18 parts of vanadium pentoxide are suspended in 300 parts of water rendered weakly acid with concentrated sulfuric acid and reduced with sulfur dioxide to blue vanadyl sulfate in the usual manner. The solution is boiled and concentrated to 150 parts of water. 10 parts of aluminum oxide are transformed into potassium aluminate with 5 N. hydroxide solution. ⅓ of the vanadyl sulfate solution is treated with 10 N. potassium hydroxide solution to transform it into the coffee-brown potassium vanadite which is then mixed with the sodium aluminate solution and 100 parts of infusorial earth added.

Thereupon the remaining ⅔ of the vanadyl sulfate solution is added with vigorous agitation. The final reaction product should remain strongly alkaline to litmus.

The product is pressed, dried as usual under 100° C., broken into fragments and then sprayed with 10% sulfuric acid until the so-called salt-like body is formed. During the spraying the fragments should preferably be heated and stirred.

The product obtained after treatment with air at 400° C. is an excellent catalyst for the vapor phase oxidation of naphthalene to phthalic anhydride when a mixture of naphthalene vapors and air in the proportion of 1 to 18 by weight is passed over the catalyst at 380–410° C.

Example 6

1. A mixture of 10 parts of $V_2O_5$ plus 4 parts of $WO_3$ are dissolved in 300 parts of diluted KOH solution containing 10.5 parts of 90% KOH. About 90 parts "Celite" brick refuse or a mixture of comminuted quartz and diatomaceous earth equal in volume to the "Celite" brick refuse are added to this solution with vigorous agitation. The suspension is heated up to 80–90° C. and is gradually made faintly acid to congo using 2 N. sulfuric acid in order to precipitate out $V_2O_5$ and $WO_3$ in the diluent. The mixture obtained is then dried.

2. 22 parts of $Al_2(SO_4)_3$ 18 aq. are transformed in the usual way, with the help of ammonia, to $Al(OH)_3$ and the wet $Al(OH)_3$ is dissolved in 14 parts of 90% KOH using in 80 parts of water to form the corresponding aluminate.

The dried material obtained in #1 is impregnated with the aluminate solution by kneading thoroughly and is then formed in suitable granules. These granules are then dried at temperatures preferably under 100° C. in the presence $CO_2$, containing gases whereby a diluted base exchange body is obtained containing $V_2O_5$, $WO_3$ and $Al_2O_3$ in non-exchangeable form.

The contact mass so obtained is calcined with air and then if necessary sprayed with mineral acids such as $H_2SO_4$, HCl, $HNO_3$ in order to form a so-called salt-like body. Sometimes it is preferable to saturate with chlorine gas. Contact masses thus obtained are very efficient for the catalytic oxidation of naphthalene to alphanaphthaquinone and phthalic and anhydride when treated with gaseous naphthalene mixed with air in the ratios of 1:15 to 1:20 by weight at 370 to 420° C. for the manufacture of phthalic anhydride and in ratios of 1:40 to 1:60 for the manufacture of alphanaphthaquinone.

Instead of $V_2O_5$ and $WO_3$ other catalytically effective components can be used in this contact mass such as $V_2O_4$ and $MoO_3$. Instead of using potassium aluminate solution other metallates of elements with amphoteric property can be used such as cadmium and beryllium.

Example 7

6 parts of $V_2O_5$ are suspended in 150 parts of water to form a slurry, acidified with 5 parts of concentrated sulfuric acid and then reduced to the blue vanadyl sulfate in the usual manner, for example, by means of gases containing $SO_2$ which are passed into the solution at the boiling temperature. 54 parts of waterglass solution of 33° Bé. are diluted with 150 parts of water and about 60 parts of "Celite" brick refuse are stirred in. The waterglass solution is then poured into the vanadyl sulfate solution with vigorous agitation, precipitating out vanadyl silicate. Care should be taken that after all the solutions have reacted, the resulting mixture must be made neutral to litmus, if necessary with the help of small amounts of N. sulfuric acid.

10 parts of freshly precipitated aluminum oxide are treated with sufficient N/2 KOH solution to dissolve up the aluminum oxide in the form of potassium aluminate and to provide a 5–10% excess of KOH.

6 parts of $V_2O_5$ are transformed as described above, to vanadyl sulfate and dissolved in about 250 to 300 parts of water.

The vanadyl silicate obtained above is stirred in the vanadyl sulfate solution and the potassium aluminate is added with vigorous agitation whereby, a base exchange body is obtained containing $V_2O_4$ and $Al_2O_3$ in nonexchangeable form diluted with vanadyl silicate and "Celite" brick refuse. In adding the potassium aluminate, care should be taken that after all the aluminate is added the reaction mixture reacts at least neutral or alkaline to phenolphthalein. If necessary small amounts of additional alkali can be added.

The reaction mixture is separated from the mother liquor in the usual way and then dried and broken into suitable pieces. After calcination with air at 400° C. in order to dehydrate the contact mass, diluted $SO_2$ gases are passed over the contact mass to neutralize the alkali content of the base exchange body.

The pretreated contact mass is very efficient for the catalytic oxidation of naphthalene to alphanaphthaquinone and phthalic anhydride when naphthalene vapors mixed with air in the ratio of 1:40 for the manufacture of alphanaphthaquinone and 1:16 for the manufacture of phthalic anhydride are passed over the contact mass at 370 to 400° C.

In Example 7 the metallate solution is added to the metal salt solution instead of vice versa, as in the other examples. Such a method of production is included in the present invention, but for most catalysts I prefer the converse method, since when the metal salt solutions are added to the metallate solutions the alkalinity of the latter assures the maintenance of an alkaline reaction throughout the mixing.

In the claims the catalysts are defined as of the time when they are freshly prepared because during catalysis or during calcination with air or acid gases the catalysts lose their base exchanging power. It should be understood, therefore, that the claims are directed to the catalyst as of the time when it is freshly prepared, but, of course, do not include catalysts which after being freshly prepared are subjected to far reaching chemical treatment other than calcination with or without acid gases before being used in the oxidation of naphthalene.

This application is a division of my copending application Serial No. 211,638, filed August 8, 1927, which matured into Patent No. 1,735,763 dated November 12, 1929.

What is claimed as new is:

1. A method of oxidizing naphthalene to intermediate products, which comprises vaporizing naphthalene and causing the vapors to react with an oxidizing gas in the presence of a contact mass containing at least one compound included in the group consisting of non-silicious base exchange bodies, salt-like bodies produced by the reaction of non-silicious base exchange bodies with anions capable of forming salt-like bodies therewith.

2. A method of oxidizing naphthalene to intermediate products, which comprises vaporizing naphthalene and causing the vapors to react with an oxidizing gas in the presence of a contact mass containing at least one diluted compound included in the group consisting of non-silicious base exchange bodies, salt-like bodies produced by the reaction of non-silicious base exchange bodies with anions capable of forming salt-like bodies therewith.

3. A method of oxidizing naphthalene to intermediate products, which comprises vaporizing naphthalene and causing the vapors to react with an oxidizing gas in the presence of a contact mass containing at least one non-silicious base exchange body, at least one catalytically active component of the contact mass being chemically combined with the non-silicious base exchange body.

4. A method of oxidizing naphthalene to intermediate products, which comprises vaporizing naphthalene and causing the vapors to react with an oxidizing gas in the presence of a contact mass containing at least one non-silicious base exchange body, at least one catalytically effective component of the contact mass being chemically combined with the non-silicious base exchange body in non-exchangeable form.

5. A method of oxidizing naphthalene to intermediate products, which comprises vaporizing naphthalene and causing the vapors to react with an oxidizing gas in the presence of a contact mass containing at least one diluted non-silicious base exchange body, at least one catalytically effective component of the contact mass being physically associated with the non-silicious base exchange body in the form of a diluent.

6. A method of oxidizing naphthalene to intermediate products, which comprises vaporizing naphthalene and causing the vapors to react with an oxidizing gas in the presence of a contact mass containing at least one non-silicious base exchange body in which chemically combined vanadium is present.

7. A method of oxidizing naphthalene to intermediate products, which comprises vaporizing naphthalene and causing the vapors to react with an oxidizing gas in the presence of a contact mass containing at least one diluted non-silicious base exchange body, at least part of the diluents containing vanadium compounds.

Signed at Pittsburgh, Pennsylvania, this 21st day of March, 1928.

ALPHONS O. JAEGER.